(12) United States Patent
Ogura et al.

(10) Patent No.: US 7,447,849 B2
(45) Date of Patent: Nov. 4, 2008

(54) MEMORY CONTROLLER CONFIGURATION SYSTEM AND METHOD

(75) Inventors: Keigo Ogura, Nerima-ku (JP); Takafumi Fujiwara, Sumida-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 167 days.

(21) Appl. No.: 11/378,002

(22) Filed: Mar. 17, 2006

(65) Prior Publication Data

US 2006/0236043 A1 Oct. 19, 2006

(30) Foreign Application Priority Data

Mar. 30, 2005 (JP) .............................. 2005-099418

(51) Int. Cl.
*G06F 12/00* (2006.01)
(52) U.S. Cl. ...................... 711/154; 711/167
(58) Field of Classification Search .................. None
See application file for complete search history.

(56) References Cited

U.S. PATENT DOCUMENTS

| | | | | | |
|---|---|---|---|---|---|
| 5,109,520 | A | * | 4/1992 | Knierim | 345/532 |
| 5,689,678 | A | * | 11/1997 | Stallmo et al. | 711/114 |
| 5,896,492 | A | * | 4/1999 | Chong, Jr. | 714/3 |
| 2001/0039605 | A1 | * | 11/2001 | Uematsu | 711/154 |

FOREIGN PATENT DOCUMENTS

JP 06-67994 A 3/1994

* cited by examiner

*Primary Examiner*—Reginald G Bragdon
*Assistant Examiner*—Larry T Mackall
(74) *Attorney, Agent, or Firm*—Canon U.S.A., Inc., IP Division

(57) ABSTRACT

A memory system includes a memory and a plurality of memory controllers for accessing the memory. One of the plurality of memory controllers synchronizes the one of the plurality of memory controllers with the plurality of memory controllers.

5 Claims, 10 Drawing Sheets

MEMORY CONTROLLER CONFIGURATION SYSTEM AND METHOD

BACKGROUND OF THE INVENTION

1. Field of the Invention

The present invention relates to memory controllers and memory systems.

2. Description of the Related Art

When designing a system including a dynamic random access memory (DRAM), the memory capacity and performance that the system requires are calculated to design a memory controller that can cope with the maximum requirement. Since maximum performance is required for such a memory controller, during the design process the memory controller is designed to have a wide bus, thus increasing the number of external pins of an integrated circuit (IC).

For example, since the resolution of multifunction printers (MFP) has increased, various memory capacities and performances are required for the system. Accordingly, there is a need for memory controllers that can cope with the various system requirements. In the system design process, a memory controller that can cope with the maximum requirement is designed after estimating the required memory capacity and performance.

However, there are cases where, for example, nine out of ten products require a medium memory capacity and performance, while one product requires a large memory capacity and high performance in order to meet its maximum requirement. In such cases, the system is often standardized by designing the ICs to meet the requirements of the large capacity and high performance product (i.e., to have a wide bus width and more external pins).

In the system designed in such a manner, the product requiring the medium or less memory capacity and performance may have a capability exceeding its maximum requirement. An increase in the number of external pins increases not only the cost of the IC itself, but also the cost of the final product. Additionally, power consumption of the IC may unnecessarily increase.

For example, a color copying machine, which employs electrophotographic technologies, having multiple drums, uses a memory for implementing a data output mechanism. In this mechanism, data of multiple colors, simultaneously output from a main memory, is sequentially output at different timings to image processors in the drums. Regarding this mechanism, the capacity of a delay memory that temporarily stores the data undesirably increases.

In addition to the increase in memory capacity, the required performance of the memory controller significantly differs among the various types of copying machine. This results in the presence of a memory controller having a capability that exceeds the maximum requirement or the presence of an IC including the memory controller that has various bus widths.

SUMMARY OF THE INVENTION

In order to solve the above-described problem, the present invention provides a memory controller capable of flexibly coping with necessary memory capacity and performance on a system-by-system basis.

The present invention also provides a memory controller including accessing means for accessing a memory, and synchronizing means for synchronizing the memory controller with at least one other memory controller that accesses the memory.

The present invention further provides a memory system having a memory, and a plurality of memory controllers for accessing the memory, wherein one of the plurality of memory controllers has synchronizing means for synchronizing the one of the plurality of memory controllers with the plurality of memory controllers.

Further features of the present invention will become apparent from the following description of exemplary embodiments with reference to the attached drawings.

DESCRIPTION OF THE EMBODIMENTS

Exemplary embodiments of the present invention are described below with reference to the accompanying drawings.

Figure 1:
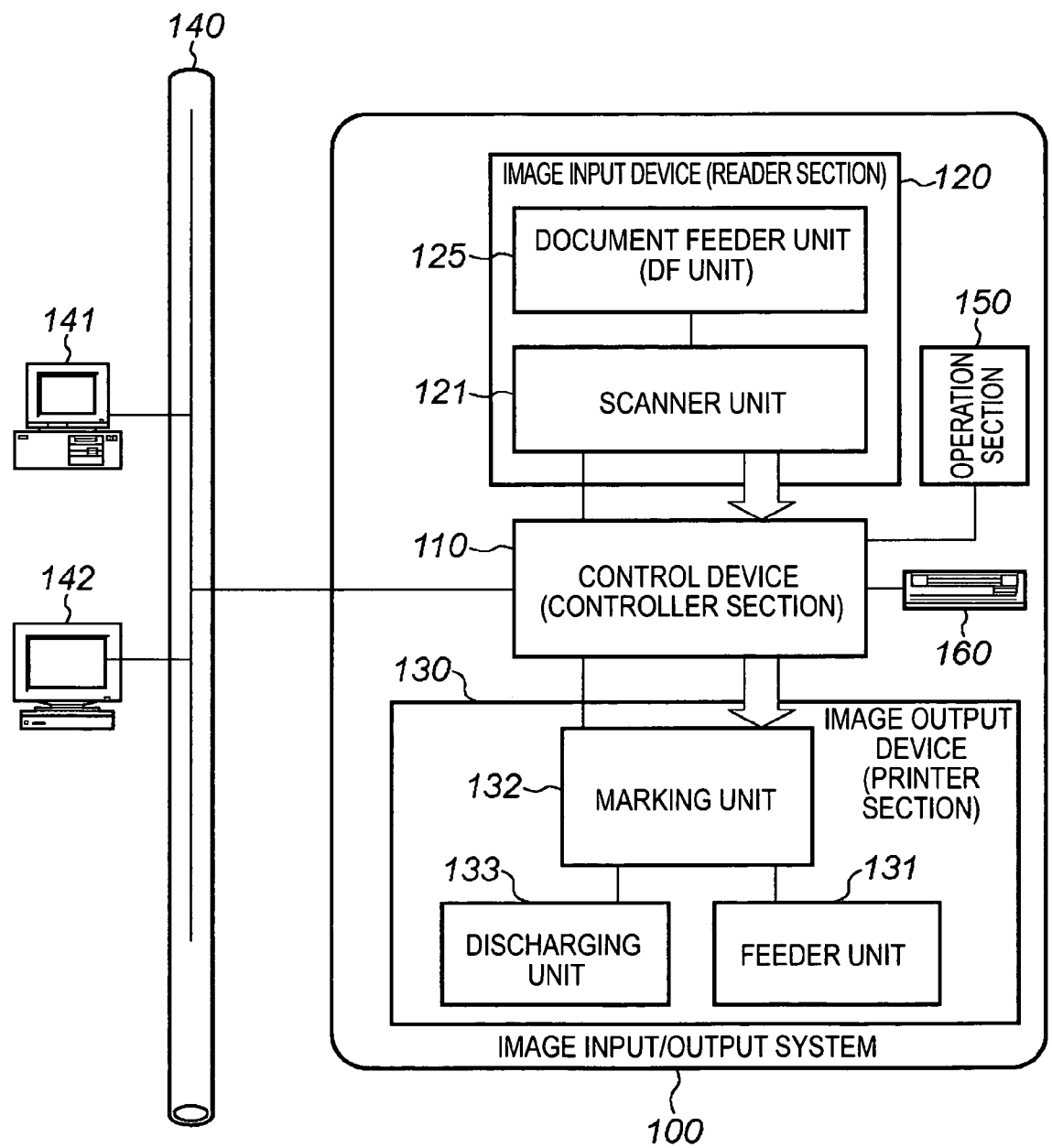
FIG. 1 is a schematic block diagram showing an example of an image input/output system configuration.

Referring to FIG. 1, the entire configuration of an image input/output system is now described.

FIG. 1 is a schematic block diagram showing an example of an image input/output system configuration. Referring to FIG. 1, a reader section (image input device) 120 optically scans an image on a document, converts the scanned image into image data, and outputs the converted data. The reader section 120 includes a scanner unit 121 for scanning the documents, and a document feeder unit (DF unit) 125 for conveying the documents.

A printer section (image output device) 130 conveys recording sheets, prints the image data onto the recording sheets as visible images, and discharges the printed sheets. The printer section 130 includes a feeder unit 131, a marking unit 132, and a discharging unit 133. The feeder unit 131 has recording sheet cassettes (not shown) for holding the recording sheets of different kinds. The marking unit 132 has functions to transfer and fix the image data onto the recording sheets. The discharging unit 133 has functions to sort and staple the printed sheets, and to discharge them.

A controller section (control device) 110 is electrically connected to the reader section 120 and the printer section 130. The controller section 110 is also connected to personal computers (PCs) 141 and 142 through a network (LAN) 140, and to a drive unit 160, such as a CD-ROM drive and a DVD-ROM drive.

The controller section 110 provides a copying function by controlling the reader section 120 to scan the image on the document to produce the image data and the printer 130 to output the image data onto the recording sheet. The controller section 110 also provides a scanning function by converting the image data read by the reader section 120 into code data, and then sending the code data to the PC 141 or 142 through the network 140. Furthermore, the controller section 110 provides a printing function by converting the code data received from PC 141 or 142 through the network 140 into the image data, and then outputting the image data to the printer section 130.

An operation section 150 including a liquid crystal touch panel (not shown) is also connected to the controller section 110. The operation section 150 provides a user interface (I/F) so that a user can operate the image input/output system 100.

Memory controllers according to embodiments of the present invention are applicable to printer systems that perform image processing, in the above-described controller section 110, on the read out image data and the code data sent from the PC 141 or 142.

Figure 2:
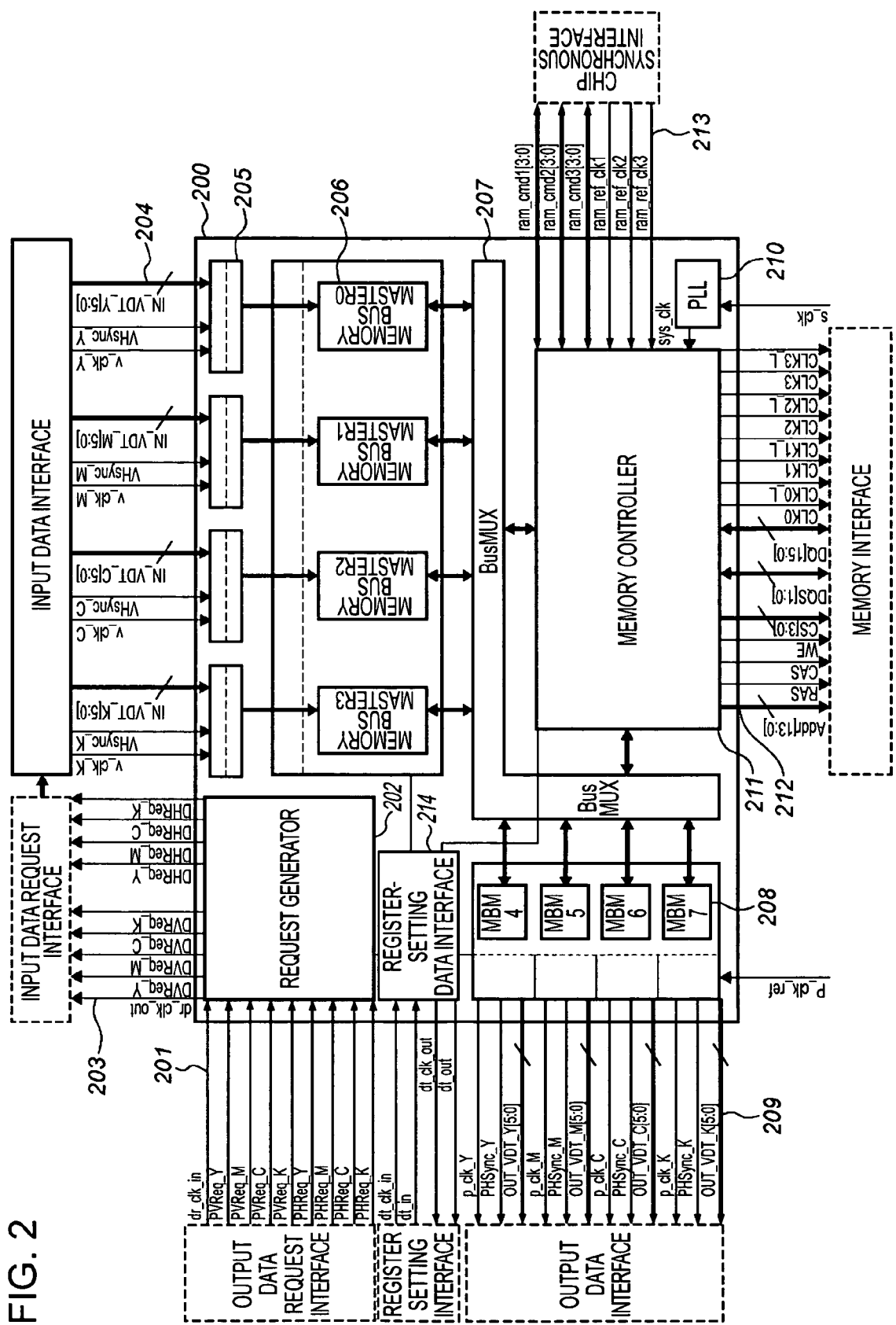
FIG. 2 shows an example of a memory controller IC 200 applied to the embodiments of the present invention.

FIG. 2 shows an example of a memory controller IC 200 applied to embodiments of the present invention. The memory controller IC 200 is provided in the controller section 110. Referring to FIG. 2, when the memory controller IC 200 receives a first data output request signal 201 from the printer section 130, a request signal generator (request generator) 202 sends an image data output request signal 203 to a main controller included in the controller section 110. This main controller corresponds to a main CPU 501 in FIG. 5, a main CPU 601 in FIG. 6, and main CPUs 1001 and 1002 in FIG. 10, which are described below. Upon receiving the request signal 203, the main controller transfers the image data to an image processor included in the controller section 110. The image processor then outputs the image data after performing predetermined image processing on the image data. This image processor corresponds to an image processor 504 in FIG. 5, image processors 604 and 605 in FIG. 6, and image processors 1006 to 1009 in FIG. 10, which are described below.

Each input interface 205 of the memory controller IC 200 then receives input data 204 that is output from the image processor, and the received data is synchronized with an internal clock (not shown). Each memory bus master 206 temporarily stores input data 204 in a write data buffer that is provided in the memory bus master 206. If the predetermined amount of data is stored in the buffer, the memory bus master 206 issues a write request to a memory controller 211.

Regarding a 4D printer (i.e., printer having four drums, each of which corresponds to one of the four colors), for example, output timings at which the printer section 130 outputs the request signals 201 for each color are different. However, the data for each color is supplied to the memory controller IC 200 simultaneously, since the image processors may process the image data taking the correlation of the four-color data into account. An image processor module for calculating the color correlation is desirably provided between the input interfaces 205 and memory bus masters 206, although it is not shown in FIG. 2.

The image processing operation is performed on the image data with consideration of the correlation for the four colors. When the recording sheet is conveyed to the predetermined position at a printing rate, the printer section 130 outputs second, third, and fourth data output request signals 201 after an interval of time has passed since the output of the first request signal. The data of the four colors that are written in each memory area of a main memory is then read out.

To enable the operations to write and read the data of the four colors to and from an external memory to be performed separately, the memory controller IC 200 is configured in the following manner. The memory controller IC 200 includes a memory bus multiplexer (MUX) 207, which allows the memory bus masters for writing 206 and the memory bus masters for reading 208 to sequentially access the memory controller 211. The data 209 read from the external memory is then output to a printer interface included in the controller section 110 (ultimately, to the printer section 130).

Furthermore, the memory controller IC 200 has a function to access a memory device having a wide bit width by synchronizing with the other memory controller ICs of the same kind. To achieve this function, the memory controller IC 200 includes a chip synchronous interface 213.

In this case, since a single memory controller IC has 16-bit memory data bus and a maximum of four ICs can be connected, the configuration of a system that connects to a 64-bit memory device at maximum is possible. This allows the memory control system to be connected to memory devices and memory modules having various bit widths, such as 4-bit, 8-bit, 16-bit, 32-bit, and 64-bit.

In this case, one of the above-described memory bus masters 206 or 208 may be configured to operate at the same time so as to control the data path.

The memory controller IC 200 further includes a phase-locked loop (PLL) 210, a memory (external memory) interface 212, and a register-setting data interface 214. The PLL 210 generates clock signals used for operating the memory controller 211. The register setting for identifying control operations of each internal block is made with the register-setting data interface 214.

Information, such as an initialization status of the memory controller IC 200, output timings of various memory access commands, burst length, refresh counter, memory space allocation, memory device selection, and status registers is set by the register-setting data interface 214.

Moreover, when extending a system, registers for setting information that is necessary to identify the operation modes are provided in each module. These registers include information, such as presence of the synchronization between chips as a system, timing parameters for clock adjustment used for detecting the clocks of the slave IC, and timing parameters for the master memory controller IC.

In the above-described case, a master memory controller IC controls all slave memory controller ICs together. However, the master memory controller IC may assign an ID to each slave memory controller IC and separately control them using the assigned IDs.

An example of a DRAM device that is connected to a memory controller IC 200 is described. When using a single memory controller IC 200, switching the settings of the internal register of the memory controller IC 200 allows the memory controller IC 200 to be connected to a single DRAM device whose bit width is 16-bit, 8-bit, or 4-bit.

Figure 3:
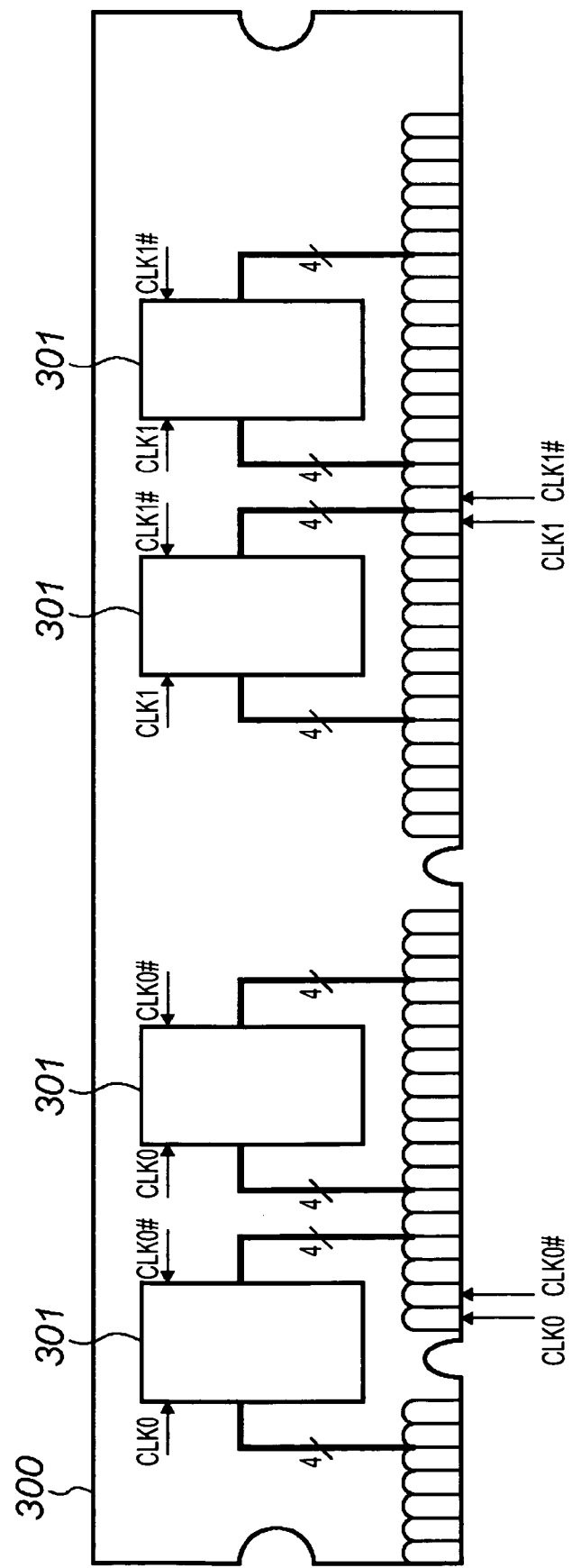
FIG. 3 shows a 32-bit memory module including four 8-bit memory devices.

When using two memory controller ICs 200, namely a master memory controller and a slave memory controller, connected to each other, a connection shown in FIG. 3 is possible. More specifically, a 32-bit dual in-line memory module (DIMM) 300 can be connected to two memory controller ICs 200.

Each memory device 301 included in the DIMM 300 is an 8-bit device. One memory controller IC writes and reads the data to and from two memory devices 301. The DIMM 300 has two kinds of clock inputs, both of which are connected to clock signals CLKs (noninverted/inverted) output from the master memory controller IC.

Additionally, when four memory controller ICs 200, i.e., one master memory controller IC and three slave memory controller ICs, are connected to organize a system, the following configuration is available. A 64-bit DIMM 400 including eight 8-bit memory devices 401 is connected to the memory controller ICs 200.

Figure 4:
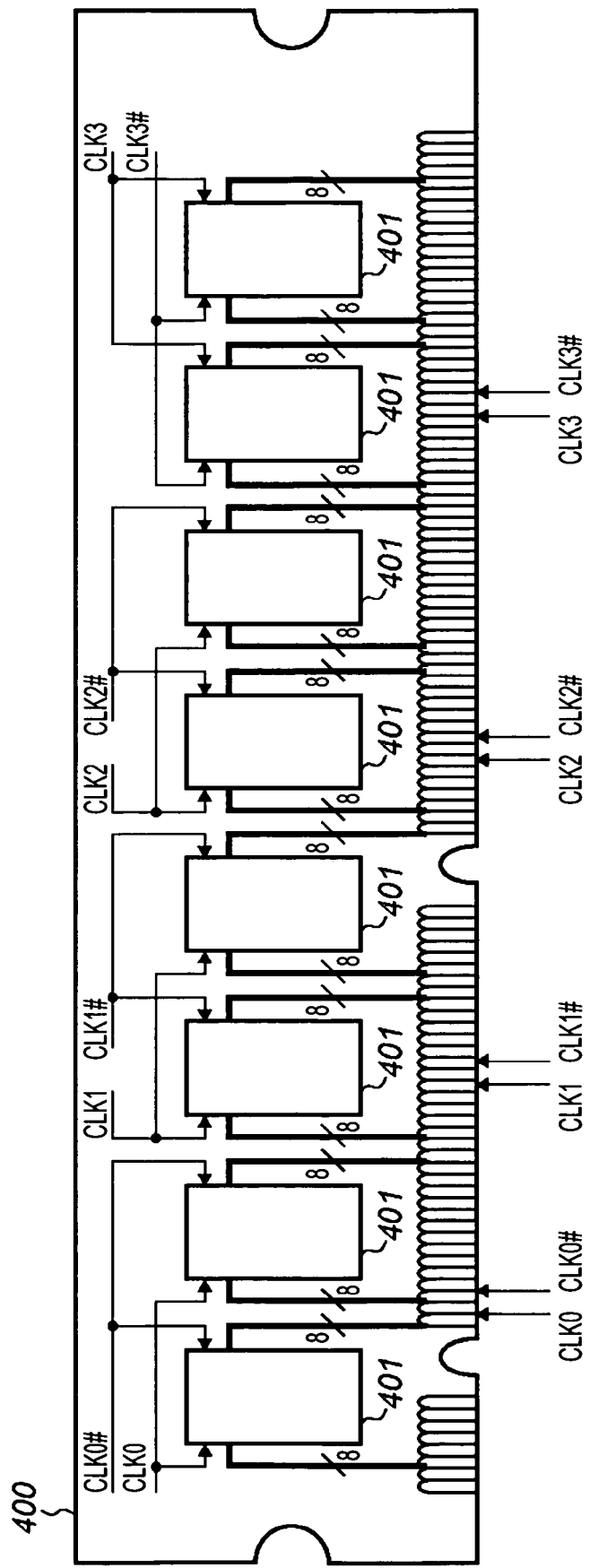
FIG. 4 shows a 64-bit memory module including eight 8-bit memory devices.

Likewise, one memory controller IC 200 accesses the two memory devices 401 shown in FIG. 4. The DIMM 400 has four kinds of clock inputs, all of which are usually connected to the clock signals CLKs output from the master memory controller IC.

In the following, examples of a memory controller IC 200 according to exemplary embodiments of the present invention are described with reference to the accompanying drawings.

First Embodiment

A first embodiment in which a memory controller IC 200 is applied to a printer that does not require large memory capacity and high performance as a system is described. The system in the first embodiment corresponds to a system applied to a so-called low-end apparatus.

Figure 5:
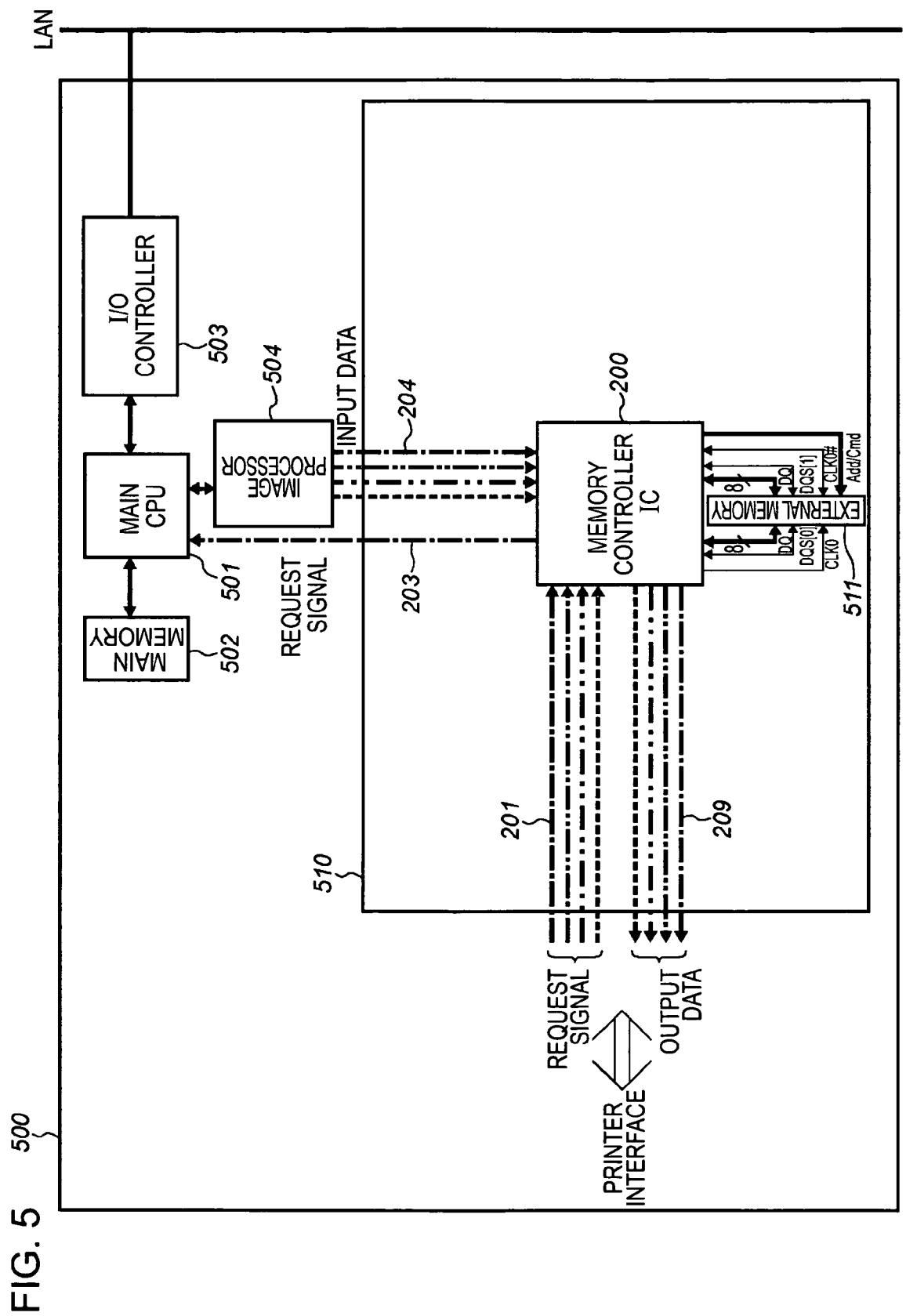
FIG. 5 shows an example of a system configuration including a memory controller IC according to a first embodiment of the present invention.

FIG. 5 shows an example of a system configuration that includes a memory controller IC according to the first embodiment. A main CPU 501, i.e., a main controller, which is mounted on a main board 500, controls the entire system. A main memory 502 is connected to the main CPU 501, and is used for temporarily storing data. An I/O controller 503 is also connected to the main CPU 501, enabling output and input controls to and from a network such as a LAN, or a general-purpose interface such as a universal serial bus (USB) (not shown).

An image processor board 510 is connected to the main board 500. The output data from the main CPU 501 is supplied to a memory controller IC 200 as an input data 204 through an image processor 504.

In this example, the memory controller IC 200 operates in an independent mode, since the system includes a single memory controller IC 200.

In the above-described configuration, upon receiving a print command from a user, the main CPU (main controller) 501 confirms that a printer section 130 is in a state of "Ready", and then waits for a request signal 201 sent from the printer section 130. Upon receiving the request signal 201, the main CPU 501 loads the data in the main memory 502, and transfers the data to an image processor 504. The image processor 504 performs the predetermined image processing on the transferred data, and outputs the processed data to memory bus masters 206. The memory bus masters 206 are provided in the memory controller IC 200, each processing the data corresponding to one color. Each of the memory bus masters 206 then issues a memory access request to a memory controller 211 such that the data is written in an external memory 511.

Since each memory bus master 206 operates independently, the memory bus masters 206 can access the external memory 511 in the order that the request is accepted.

While the data is written in the external memory 511 from the main memory 502, memory bus masters for reading 208 in the memory controller IC 200 are notified with a second request signal 201 sent from the printer section 130.

This causes the memory controller 211 in the memory controller IC 200 to issue a data read request to the external memory 511 such that the data is read from the external memory 511. The read data is output to the printer section 130. The printer section 130 then outputs the image after processing the print data. At this time, the data of a first color that has a data amount equivalent to a yield of a few lines may be stored in the external memory 511 in order to adjust the output timing of the data to the printer section 130. Alternatively, the data may be output directly to the printer section 130 without accessing the external memory 511. Also, the data output may be performed by controlling these configurations to be switched.

Second Embodiment

Now, a second embodiment is described. In this embodiment, memory controller ICs are applied to middle-range printers that require more memory capacity and higher performance than the low-end printers.

Figure 6:
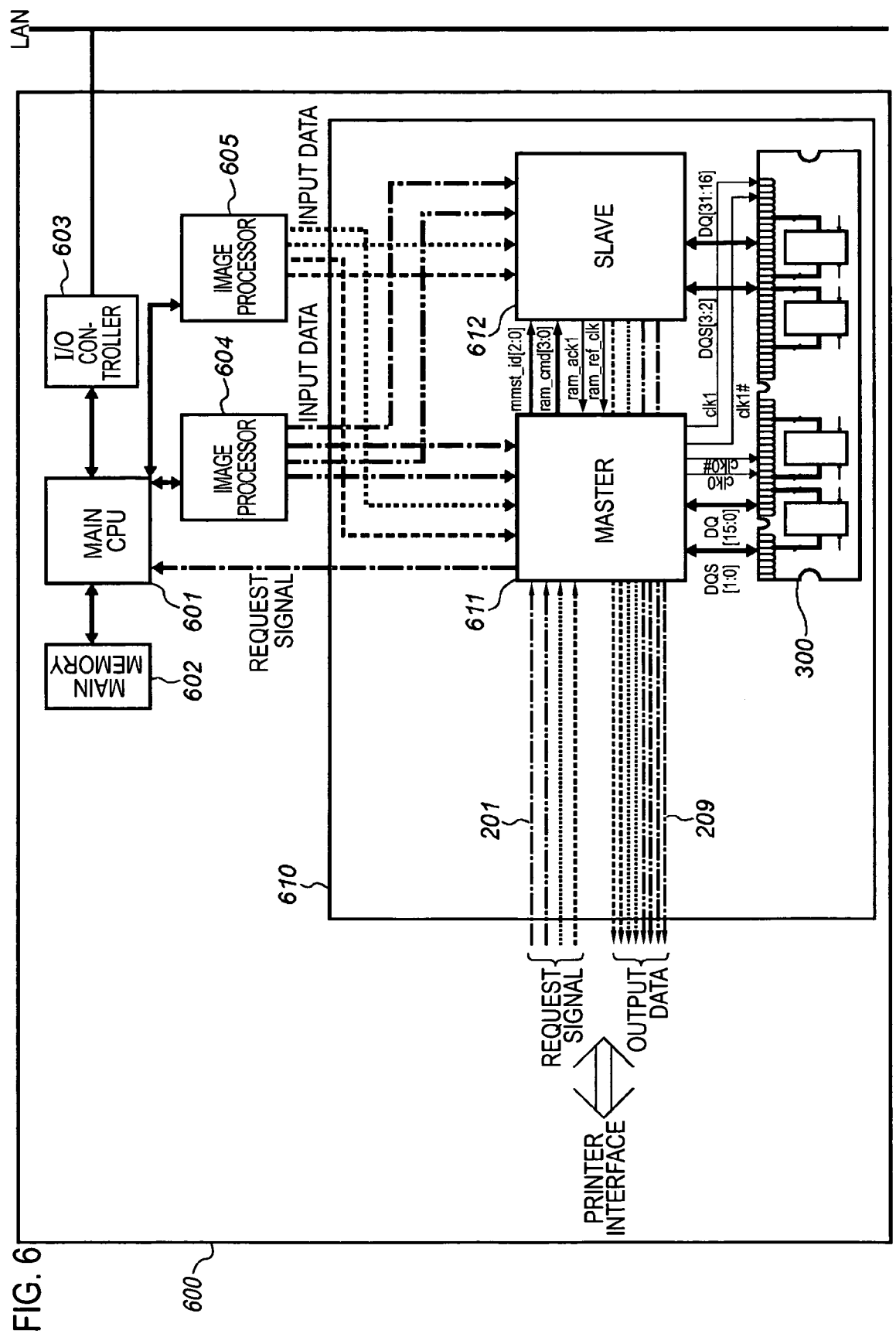
FIG. 6 shows an example of a system configuration including memory controller ICs according to a second embodiment of the present invention.

FIG. 6 shows an example of a system configuration including memory controller ICs according to the second embodiment. In this example, an amount of image data of one color to be processed is twice as much as the bit width of the input/output interface of one memory controller IC 200. As shown in FIG. 6, a main CPU 601, a main memory 602, an I/O controller 603 are provided on a main board 600. In addition to those, two image processors (image processing circuits) 604 and 605 are provided on the main board 600 to process the double amount of image data.

Two memory controller ICs (memory controller circuits) 200 are mounted on an image processor board 610, i.e., a sub board. It is necessary to set the memory controller ICs 200 to be a master IC 611 and a slave IC 612. This master-slave setting may be made by an internal register setting or by an external pin setting.

The two image processors 604 and 605 and the two memory controller ICs, i.e., a master IC 611 and a slave IC 612, are connected on the board such that the data of the four colors is supplied to each memory controller IC.

Furthermore, the two memory controller ICs, i.e., the master IC 611 and the slave IC 612, are connected to an external memory device (memory module) 300 in the following manner. The configuration of the external memory device 300 is shown in FIG. 3.

Strobe signals and data signals correspond to each other as follows: DQS[0]-DQ[7:0], DQS[1]-DQ[15:8], DQS[2]-DQ[23-16], and DQS[3]-DQ[31:24]. Each pair of the strobe signal and data is connected to the corresponding memory device 301.

As shown in FIG. 6, an address of the external memory, control signals, clock signals are output to the external memory device 300 only from the master IC 611. The external memory device 300 is therefore a synchronous dynamic random access memory (SDRAM) that operates on the basis of the clock signals of the master IC 611. The clock inputs of the external memory device 300 are connected to predetermined pins of the master IC 611 in order to supply the clock signals to the memory devices 301 corresponding to the slave IC 612. The configuration of the external memory device 300 is shown in FIG. 3.

Referring to the system shown in FIG. 6, an exemplary method for accessing the external memory device 300 from the master IC 611 and the slave IC 612 is described.

The master IC 611 includes a detector for detecting the clock signal of the slave IC 612 as part of the initialization sequence.

Figure 7:
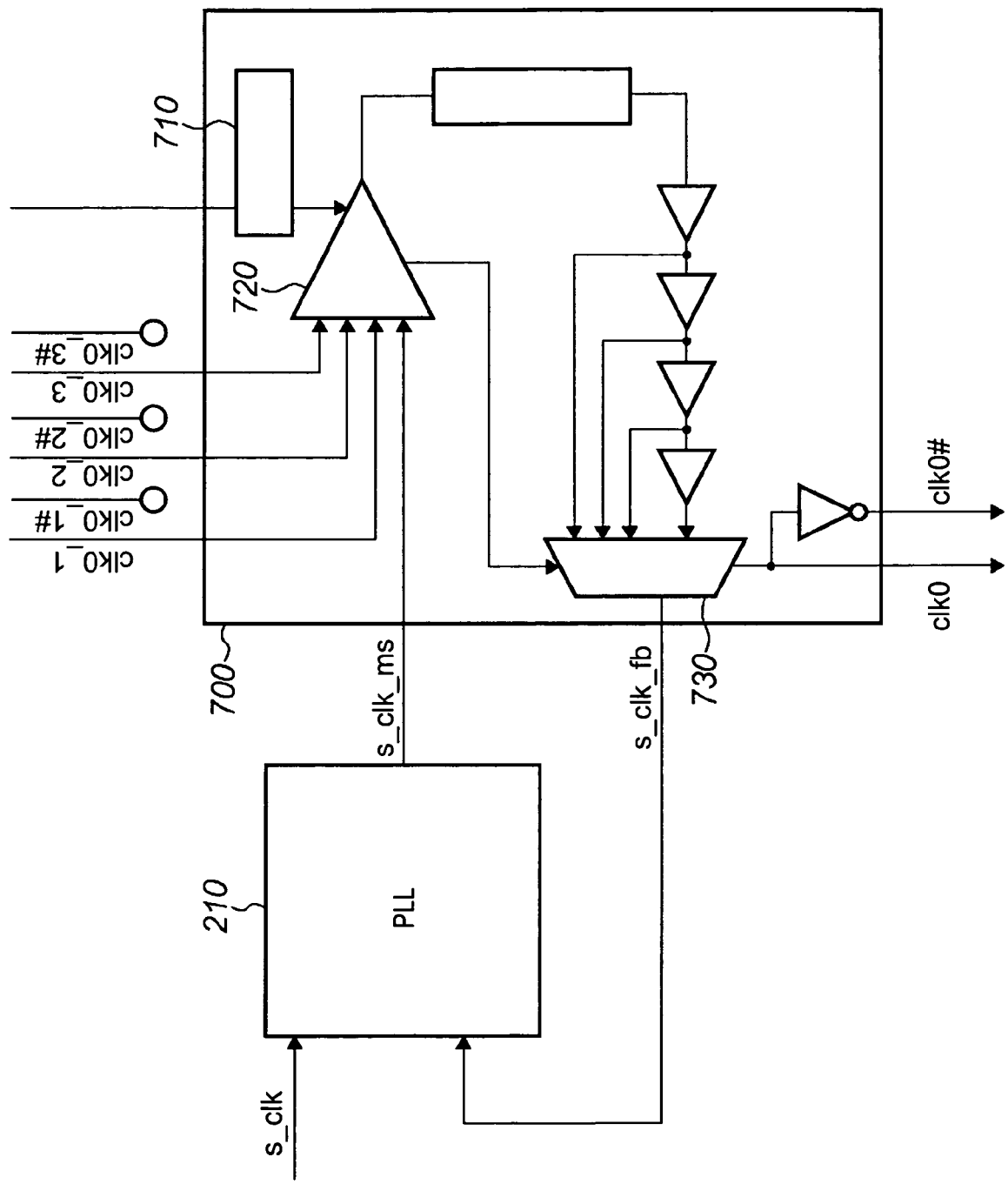
FIG. 7 shows an example of a detecting circuit for detecting clocks of slave ICs.

FIG. 7 shows an example of a detecting circuit for detecting the clocks of the slave ICs. This detecting circuit is included in both the master IC 611 and the slave IC 612. However, the detecting circuit is not used once the IC is defined as the slave IC 612 by initial settings.

Referring to FIG. 7, a clock detecting circuit 700 includes a setting register 710, a difference detecting circuit 720, and a selector 730. This difference detecting circuit 720, which has clock input interfaces for the external memory corresponding to the other slave ICs, detects the difference among the input clocks. In the example shown in FIG. 7, the difference detecting circuit 720 has three input interfaces for three slave ICs, since a maximum of four ICs are allowed to access the external memory.

Expected delay time at a board interface may be set in the setting register 710 as an offset value. The selector 730 selects the optimal feedback clock on the basis of difference between each clock that is calculated by the difference detecting circuit 720. The selected clock is fed back to the PLL 210, and is output as an internal system clock of the master IC 611.

With the above-described procedure, the difference between the clock signals CLK0/CLK0# generated by the master IC 611 and the clock signal CLK generated by the slave IC 612 is eliminated. Accordingly, the optimal clock signals both for the master IC 611 and the slave IC 612 are provided to the external memory device 300.

Additionally, when clocks cannot be synchronized by the above-described procedure, the delay time of the strobe signal output from each memory controller IC during the writing operation can be adjusted using an adjustment mechanism.

Once the output of the data on one page is started, the memory controllers applied to this system are configured to continuously access the memory until the output of the last data on the page is completed.

An operation for writing data is now described. Each memory bus masters for writing 206 stores the data supplied from the image processors 604 and 605 in the write buffer, provided in the memory bus master 206. If the amount of data equivalent to the burst length of the external memory 300 is stored in the write buffer, each of the memory bus masters 206 sequentially issues a write request for the corresponding color such that the memory access is performed. At this time, the master IC 611 outputs a signal indicating the target color (target memory bus master) as an mmst_id signal to the slave IC 612. The memory controller IC 200 includes four memory bus masters 206. However, when a plurality of ICs access the memory, only one memory bus master 206 of each memory controller IC operates at the same time to switch the data path to the memory.

Figure 8:
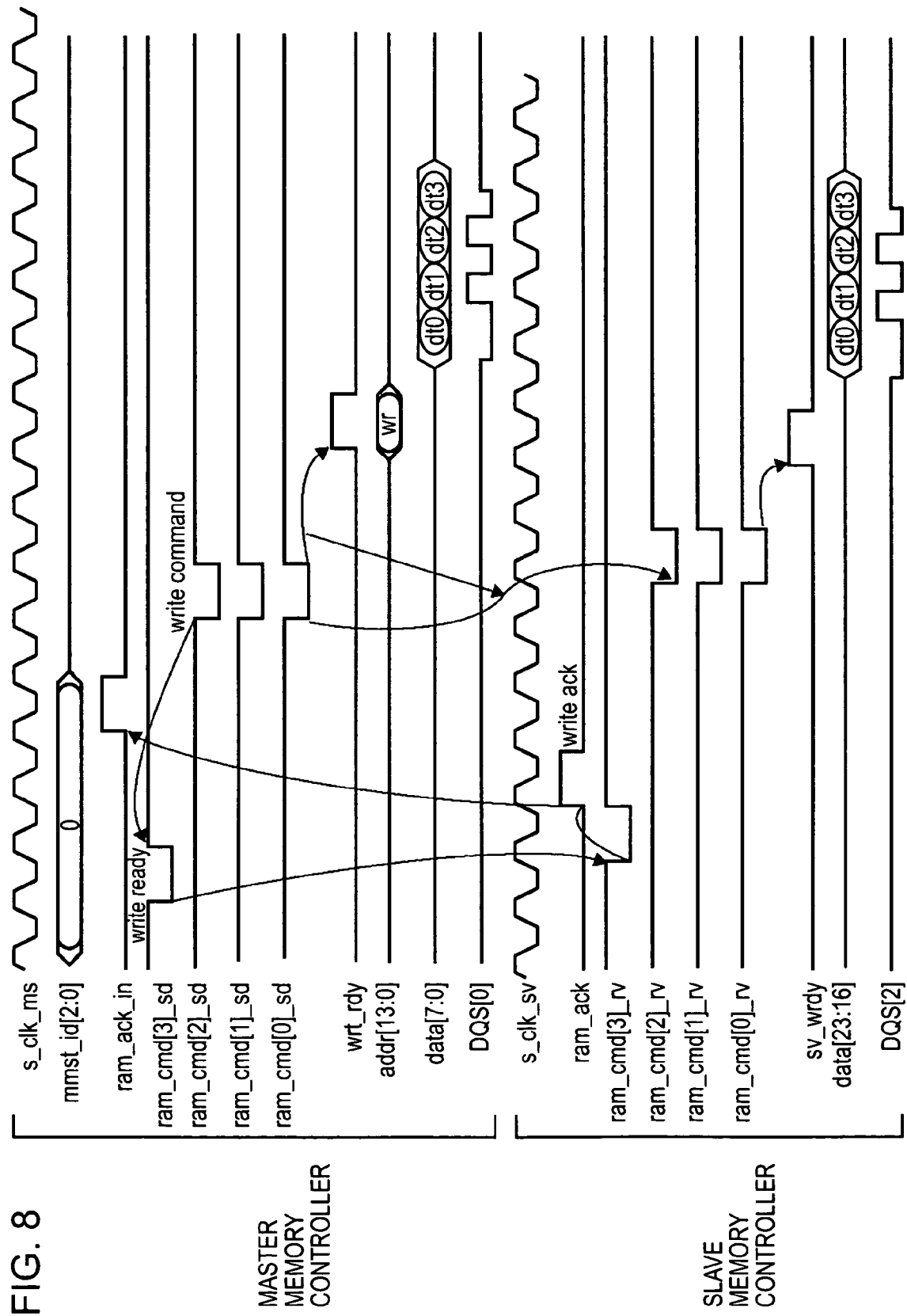
FIG. 8 is a timing chart showing the timing of each signal during a writing operation.

FIG. 8 is a timing chart showing the timing of each signal during a writing operation. As shown in FIG. 8, the memory controller 211 in the master IC 611 outputs the "Write Ready" signal to the slave IC 612 using a ram_cmd signal at a predetermined time period before the buffer becomes full. A reference value for the predetermined time period is configurable and system-specific. The memory controller 211 then waits for the ram_ack signal sent from the slave IC to perform a handshake such that the master IC 611 can detect the state of the slave IC. As shown in the example of timings of writing data, this allows the master IC to adjust the output timing of the ram_cmd signal for a write command in accordance with the slave IC.

The master IC 611 issues a write command to the slave IC 612 in the above manner. After issuing the write command, the master IC 611 asserts a wrt_rdy signal in the master IC 611 in accordance with an arrival timing of the write command at the slave IC 612. In response to the wrt_rdy signal, the memory interface 212 in the master IC 611 issues a write command and an address to the external memory device 300, and then outputs the data and strobe signals.

Upon receiving the ram_cmd signal, on the other hand, the slave IC 612 asserts the sv_wrdy signal in synchronization with the assert timing of wrt_rdy signal in the master IC 611, and then outputs the data and strobe signals.

As long as this strobe signal is in a predetermined range, the external memory device 300 can receive the data using the clock signals CLK/CLK# output from the master IC 611.

A reading operation is now described. Upon receiving a read request from the printer section 130, the memory controller continuously reads the data at predetermined intervals until the last data on the page is read out. At this time, one of the four memory bus masters for reading 208, shown in FIG. 2, operates at the same time to switch the data path of the MUX 207 corresponding to the color to be output.

Figure 9:
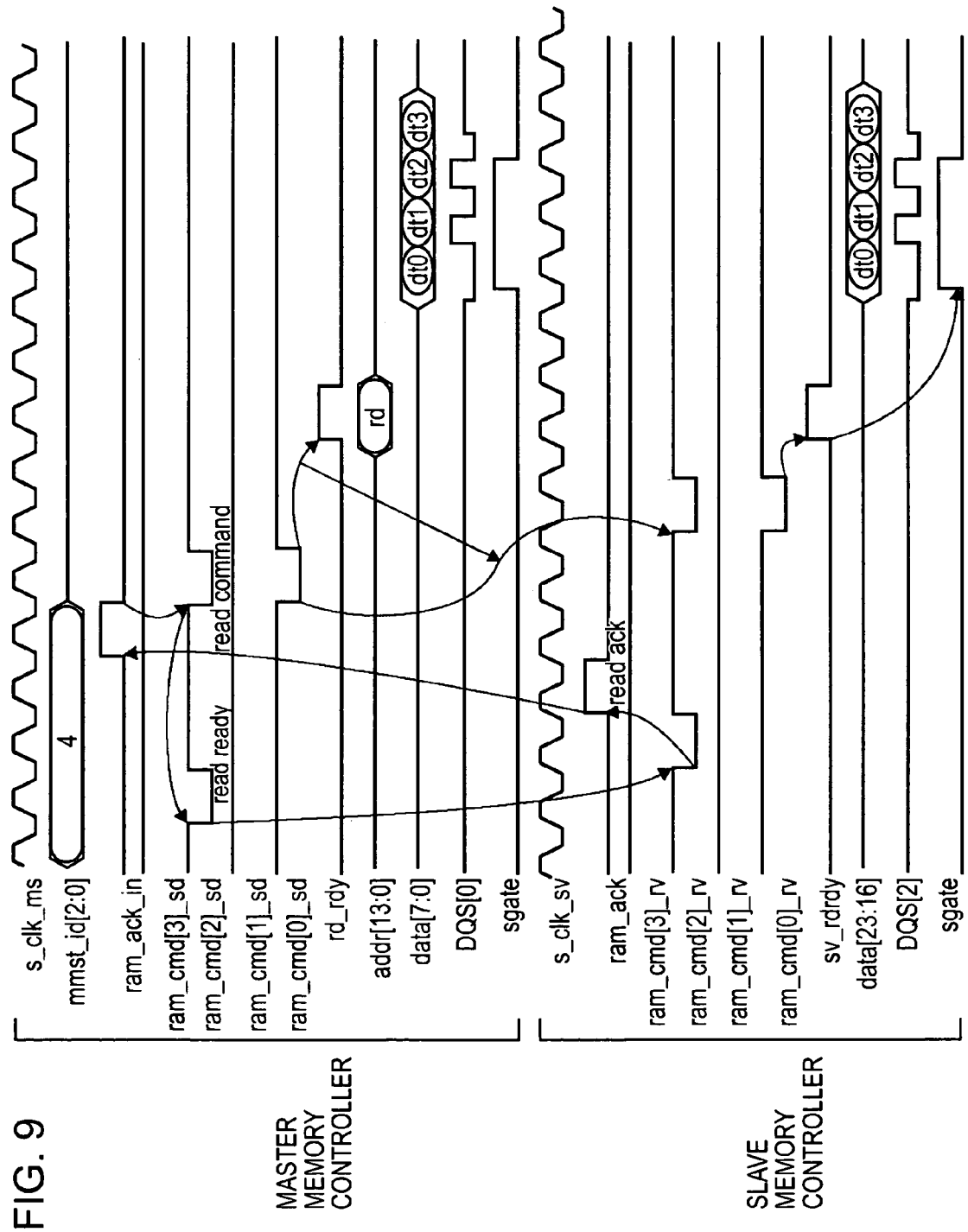
FIG. 9 is a timing chart showing the timing of each signal during a reading operation.

FIG. 9 is a timing chart showing the timing of each signal during a reading operation. As shown in FIG. 9, upon receiving a read request from the printer section 130, the memory controller 211 in the master IC 611 sends an mmst_id signal and a ram_cmd signal for a "Read Ready" command to the slave IC 612. The memory controller 211 in the master IC 611 waits for the ram_ack signal to complete a handshake, and then issues a read command to the slave IC 612 using the ram_cmd signal.

The master IC 611 asserts an rd_rdy signal in accordance with the arrival timing of the read command at the slave IC 612. The memory interface 212 then outputs a read command and an address to the external memory device 300. A sgate signal, which is a mask signal of the strobe signal input from the external memory device 300 in accordance with the reading operation, is negated at a desired timing, thereby enabling the data reception from the external device 300.

Upon receiving the read command sent from the master IC 611, on the other hand, the slave IC 612 asserts an sv_rdrdy signal, and then negates the internal mask signal. The timings for negating the mask signals are adjustable by the master IC 611 and the slave IC 612. This advantageously eliminates the difference even if the phases of a command signal transfer clock and the clocks of each IC differ.

The write request is executed in the requested order, whereas the read request is executed between the write accesses. Once the buffer becomes full and the handshake for the write request is completed, memory access can be performed three times without performing the handshake.

Third Embodiment

Now, a third embodiment is described. In this embodiment, memory controller ICs are applied to high-end printers that require large memory capacity and high performance as a system.

Figure 10:
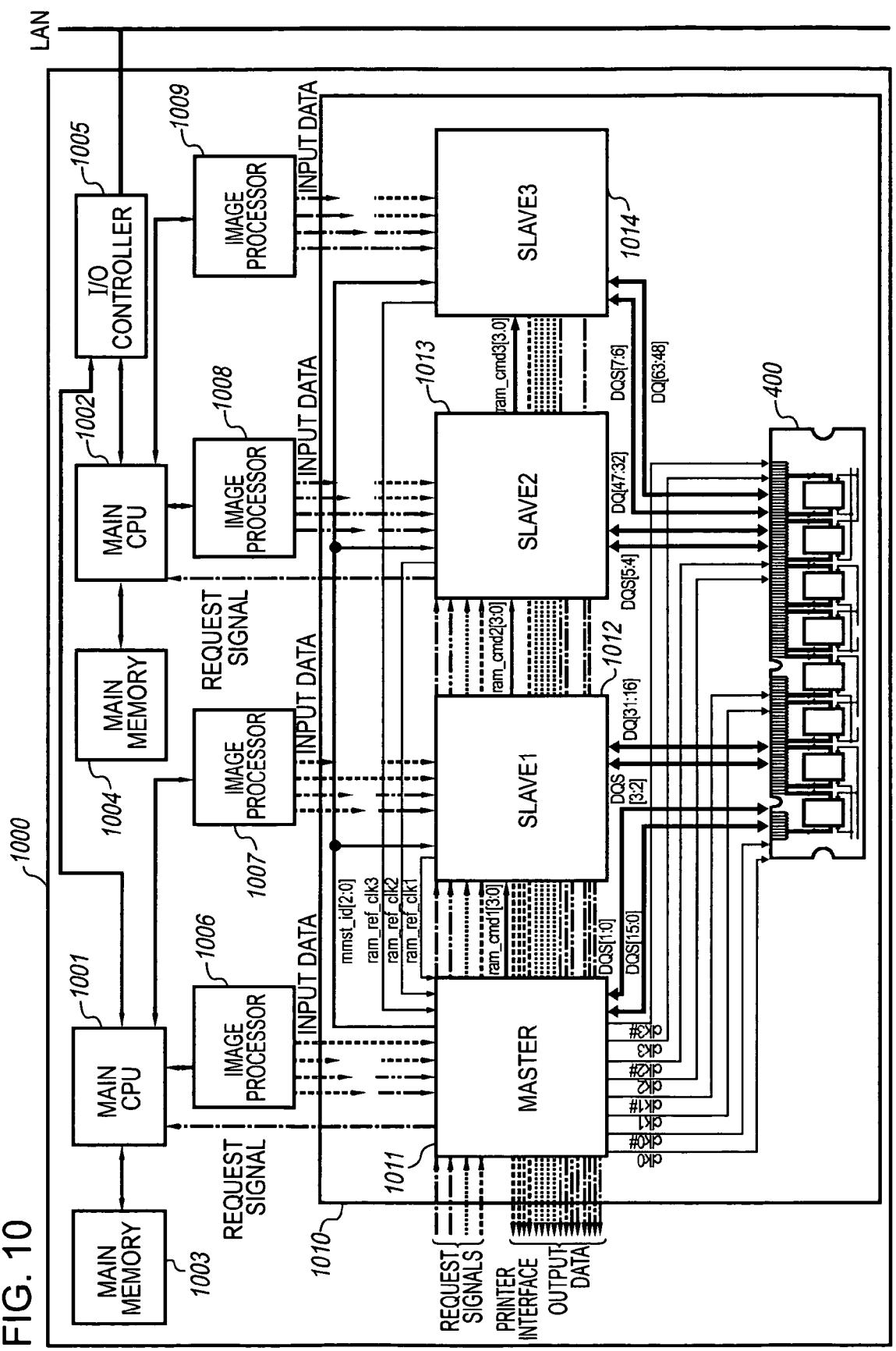
FIG. 10 shows an example of a system configuration including memory controller ICs according to a third embodiment of the present invention.

FIG. 10 shows an example of a system configuration including memory controller ICs according to the third embodiment. In this example, as shown in FIG. 10, two main CPUs 1001 and 1002 are mounted on a main board 1000 since the system requires high performance, and connected to main memories 1003 and 1004, respectively. An I/O controller 1005 is connected to the main CPUs 1001 and 1002 through buses of an identical kind. Two image processors 1006 and 1007 are connected to the main CPU 1001, and two image processors 1008 and 1009 are connected to the main CPU 1002. Each image processor performs image processing on the data of one of the four colors.

Additionally, four memory controller ICs (i.e., a master IC 1011 and three slave ICs 1012, 1013, and 1014) are mounted on an image processor board 1010. Each image processor supplies the data of one color to each memory controller IC, whereby the data of the four colors are supplied to each memory controller IC. A master-slave setting for the memory controller ICs may be made by an external pin setting or an internal register setting.

Furthermore, a 64-bit external memory device 400 is connected to each memory controller IC. The connections between this external memory device 400 and the memory controller ICs are made in the following manner. The configuration of the external memory device 400 is shown in FIG. 4.

Data and strobe signal correspond to each other as follows: DQ[7:0]-DQS[0], DQ[15:8]-DQS[1], DQ[23:16]-DQS[2], DQ[31-24]-DQS[3], DQ[39:32]-DQS[4], DQ[47:40]-DQS[5], DQ[55-48]-DQS[6], and DQ[63:56]-DQS[7].

In contrast, an address, control commands, and a plurality of clock signals supplied to the memory devices 401 provided on a memory device board are output from the master IC 1011.

Referring to the system shown in FIG. 10, an exemplary method for accessing the external memory 400 from the four memory controller ICs is described.

When the four memory controller ICs access the DIMM memory module 400, essentially the same access procedure is performed as that described in the second embodiment in which two memory controller ICs access the memory module 300.

During initialization, the master memory controller IC is supplied with the clocks from each slave IC as a reference, and adjusts its own clock so as to provide a clock that has the fastest clock rate for the three clocks of the slave ICs.

The writing operation is now described. The memory controller 211 in the master IC 1011 outputs an mmst_id signal and a ram_cmd signal for a "Write Ready" signal at a predetermined time period before the buffer becomes full. The memory controller 211 then waits for the ram_ack1/2/3 signals output from slave ICs 1012, 1013 and 1014, respectively. Here, with consideration of the time period from the output of the ram_cmd signal to the arrival of the last ram_ack signal, the memory controller 211 in the master IC 1011 adjusts the number of clock cycles until the output of the ram_cmd signals for write commands, which are shown in FIG. 8.

The master IC 1011 then outputs write commands to the slave ICs 1012 to 1014 using the ram_cmd signals. The master IC 1011 asserts a wrt_rdy signal in accordance with the arrival timings of the write commands at the slave ICs, and then outputs the data and strobe signals. If the difference between the arrival timings of the strobe signal and the clock output from the master IC is within a predetermined range, the difference is adjustable by each IC.

At this time, the handshake for the "Write Ready" signal is performed only once in order to enable the write operations of the data of four colors to be performed sequentially.

A procedure for reading data in the present embodiment is the same as that described in the second embodiment. In response to a read request sent from a printer section 130, the master IC 1011 outputs the mmst_id signal and the ram_cmd signal for a "Read Ready" signal to the slave ICs 1012 to 1014, and then waits for the ram_ack1/2/3 signals output from the slave ICs 1012 to 1014, respectively.

After the completion of the handshake, the master IC 1011 outputs read commands to the slave ICs 1012 to 1014 using ram_cmd signals. The master IC 1011 then asserts an rd_rdy signal in accordance with the arrival timings of the read commands at the slave ICs, and issues a read command and an address to an external memory device 400. When designing a board, a time period from the issuance of the command to the reception of the read data and strobe signal is estimated. Taking this time period into account, the master IC and slave ICs negate the internal mask signals, i.e., a sgate signal and a svgate signal, respectively. The master IC and slave ICs then receive the strobe signal and the data.

A memory controller system is applied to memory controllers for adjusting the delay between the drums in a printer herein. However, the memory controller system is applicable to any systems in which memory access that complies with the features of the present invention can be performed.

According to the embodiment described above, use of an identical kind of ICs allows a significant change of the configuration according to the memory capacity and performance of each system including synchronous dynamic random access memories.

The present invention may be applied to a system formed by a plurality of apparatuses (e.g., a host computer, an interface device, a reader, a printer, etc.), or to a single apparatus (e.g., a copying machine, a facsimile machine, etc.).

In addition, the features of the present invention can be achieved by supplying a system or apparatus with a recording medium containing the program code of software implementing functions in the above-described embodiments, and a computer (CPU or MPU) in the system or apparatus reads and executes the program code on the recording medium.

In this case, the program code itself, read from the recording medium, implements the functions in the above-described embodiments, whereby the recording medium containing the program code is included in the present invention.

Types of the recording medium for supplying the program code include, for example, a floppy disk, a hard disk, an optical disk, a magneto optical disk, a CD-ROM, a CD-R, a magnetic tape, a nonvolatile memory, and a read-only memory.

In addition, the present invention is not limited to the case in which the functions in the above-described embodiment are implemented by executing the read program code by the computer. The present invention includes a case in which an operating system or the like running on the computer performs all or part of actual processing on the basis of instructions of the program code, and the processing implements the functions in the above-described embodiments.

Moreover, the present invention includes a case in which, after the program code read from the recording medium is written in a memory provided in an add-on board inserted into a computer or in an add-on unit connected to the computer, a CPU or the like provided in the add-on board or add-on unit performs all or part of actual processing, and the processing implements the function in the above-described embodiment.

While the present invention has been described with reference to the preferred embodiments, the invention is not limited to the above-described embodiments and various modifications can be made within the scope of the appended claims.

This application claims the benefit of Japanese Application No. 2005-099418 filed Mar. 30, 2005, which is hereby incorporated by reference herein in its entirety.

What is claimed is:

1. A memory system comprising:
a memory;
a master memory controller for accessing the memory, the master memory controller comprising:
a plurality of master memory bus masters; and
a slave memory controller for accessing the memory, the slave memory controller comprising:
a plurality of slave memory bus masters,
wherein the master memory controller sends identification of one of the plurality of master memory bus masters to the slave memory controller, sends a ready signal to the slave memory controller, and sends a command and an address where the master memory controller and the slave memory controller access the memory in response to a signal from the slave memory controller, and wherein the master memory controller and the slave memory controller synchronously write data to the memory at the address sent from the master memory controller.

2. The memory system according to claim 1, wherein one of the plurality of master memory bus masters selected by the master memory controllers accesses the memory.

3. The memory system according to claim 1, wherein each of the plurality of master memory bus masters handles data of one color and each of the plurality of slave memory bus masters handles data of one color.

4. The memory system according to claim 1, wherein the memory has a plurality of memory modules, and the master memory controller and the slave memory controller access corresponding memory modules of the plurality of memory modules.

5. The memory system according to claim 1, wherein the number of the plurality of master memory bus masters and the number of the plurality of slave memory bus masters corresponds to a configuration of the memory.

* * * * *